(12) United States Patent
Sippel

(10) Patent No.: US 8,810,300 B2
(45) Date of Patent: Aug. 19, 2014

(54) WAVE CLOCKING

(75) Inventor: Tim Sippel, Portland, OR (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 13/331,796

(22) Filed: Dec. 20, 2011

(65) Prior Publication Data

US 2013/0043916 A1    Feb. 21, 2013

Related U.S. Application Data

(60) Provisional application No. 61/524,538, filed on Aug. 17, 2011.

(51) Int. Cl.
*G06F 1/04* (2006.01)

(52) U.S. Cl.
USPC ............ 327/298; 327/99; 327/291; 327/155; 327/161

(58) Field of Classification Search
USPC .......... 327/99, 291, 293–294, 298, 355–356, 327/358, 360–361, 155–161
See application file for complete search history.

(56) References Cited

U.S. PATENT DOCUMENTS

| | | | |
|---|---|---|---|
| 5,550,514 A * | 8/1996 | Liedberg | 331/1 A |
| 6,194,940 B1 * | 2/2001 | Hunter et al. | 327/298 |
| 6,934,215 B2 * | 8/2005 | Chung et al. | 365/233.12 |
| 6,995,621 B1 | 2/2006 | Culler | |
| 7,129,763 B1 | 10/2006 | Bennett et al. | |
| 2002/0135343 A1 | 9/2002 | Underbrink et al. | |
| 2004/0130357 A1 | 7/2004 | Smith | |
| 2007/0096775 A1 | 5/2007 | Elgebaly et al. | |
| 2008/0068100 A1 | 3/2008 | Goodnow et al. | |
| 2008/0204158 A1 | 8/2008 | Weder | |
| 2011/0140752 A1 | 6/2011 | Garg et al. | |

FOREIGN PATENT DOCUMENTS

| WO | WO 2005/088424 A2 | 9/2005 |
|---|---|---|
| WO | WO 2010/058249 A1 | 5/2010 |

OTHER PUBLICATIONS

Fischer, Tim et al., "A 90nm Variable Frequency Clock System for a Power-Managed Itanium Architecture Processor," IEEE Journal of Solid-State Circuits, vol. 41, No. 1, Jan. 2006, 11 pages.

Ernst, D., et al., "Razor: A Low-Power Pipeland Based on Circuit-Level Timing Speculation," *Proceedings of the 36th International Symposium on Microarchitecture*, Institute of Electrical and Electronics Engineers, United States (2003).

(Continued)

*Primary Examiner* — An Luu
(74) *Attorney, Agent, or Firm* — Sterne, Kessler, Goldstein & Fox P.L.L.C.

(57) ABSTRACT

Embodiments provide systems and methods for dynamically regulating the clock frequency of an integrated circuit (IC) based on the IC supply voltage. By doing so, the clock frequency is no longer constrained by a worst-case voltage level, and a higher effective clock frequency can be supported, increasing the IC performance. Embodiments include a wave clocking system which uses a plurality of delay chains configured to match substantially the delays of respective logic paths of the IC. As the delays of the logic paths vary with supply voltage and temperature changes, the delay chains matched to the logic paths experience substantially similar changes and are used to regulate the clock frequency of the IC.

20 Claims, 9 Drawing Sheets

(56) References Cited

OTHER PUBLICATIONS

International Search Report and Written Opinion of the International Searching Authority directed to related International Patent Application No. PCT/US2012/051479, mailed Oct. 26, 2012, from the International Searching Authority, European Patent Office, Netherlands 16 pages.

International Search Report and Written Opinion of the International Searching Authority directed to related International Patent Application No. PCT/US2012/051451, mailed Nov. 22, 2012, from the International Searching Authority, European Patent Office, Netherlands 16 pages.

International Preliminary Report on Patentability directed to related International Patent Application No. PCT/US2012/051451, mailed Feb. 27, 2014; 13 pages.

* cited by examiner

WAVE CLOCKING

CROSS-REFERENCE TO RELATED APPLICATION(S)

This patent application claims the benefit of U.S. Provisional Patent Application No. 61/524,538, filed Aug. 17, 2011, entitled "Power Management Unit," which is incorporated herein by reference in its entirety.

BACKGROUND

1. Field of the Invention

The present invention relates generally to data clocking in an integrated circuit (IC).

2. Background Art

The current consumed by an integrated circuit (IC) can vary dramatically, based on activity level. The supply voltage at the IC, in turn, can vary, depending on this current consumption. Different static loads can also affect the DC level of the supply voltage. Dynamic changes to the load can cause dynamic voltage transients.

Typically, the maximum clock frequency of the IC is limited by the worst-case voltage it may receive. Although most of the time the voltage provided to the IC can support a higher clock frequency, the clock frequency is still constrained to accommodate the worst-case voltage transients.

Accordingly, there is a need for adaptive clock schemes that accommodate voltage transients.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

The current consumed by an integrated circuit (IC) can vary dramatically, based on activity level. The supply voltage at the IC, in turn, can vary, depending on this current consumption. Different static loads can also affect the DC level of the supply voltage. Dynamic changes to the load can cause dynamic voltage transients.

Typically, the maximum clock frequency of the IC is limited by the worst-case voltage it may receive. Although most of the time the voltage provided to the IC can support a higher clock frequency, the clock frequency is still constrained to accommodate the worst-case voltage transients.

Figure 1:
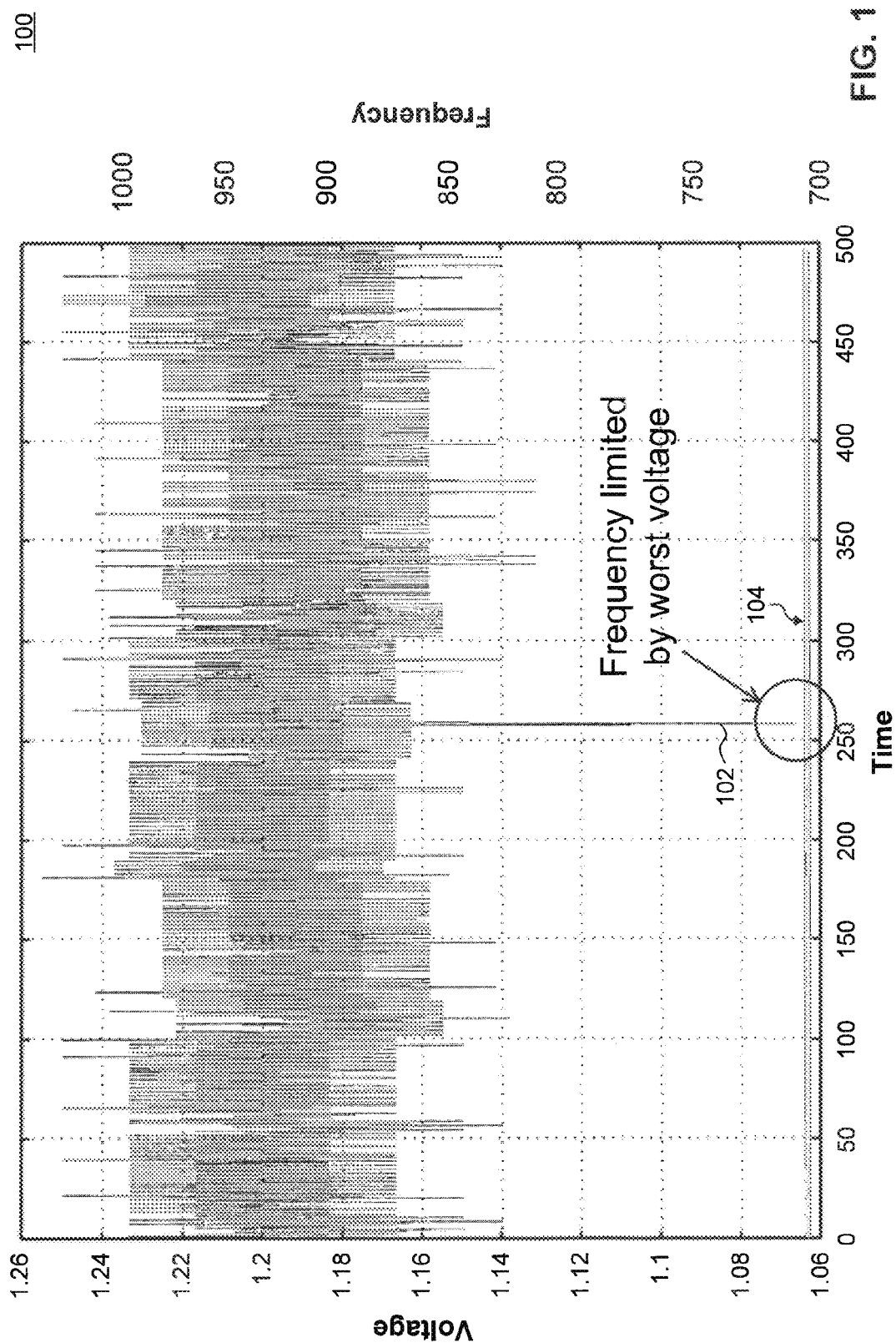
FIG. 1 is an example that illustrates a conventional way of setting the clock frequency of an integrated circuit (IC) based on the supply voltage.

FIG. 1 is an example 100 that illustrates a conventional way of setting the clock frequency of an integrated circuit (IC) based on the supply voltage. Example 100 illustrates the supply voltage provided to the IC versus time. As shown in FIG. 1, the supply voltage exhibits voltage transients of short durations over time. Very infrequently, severe voltage transients (worst-case transients) are experienced, such as voltage transient 102, for example. Nevertheless, conventionally, the frequency of the clock provided to the IC is set based on these worst-case voltage transients. In example 100, worst-case voltage transient 102 limits the IC clock frequency to a low level 104, slightly above 700 MHz, when a higher level of at least 800 MHz can be accommodated most of the time. Accordingly, the performance of the IC is limited significantly.

Embodiments of the present invention, as further described below, provide systems and methods for dynamically regulating the clock frequency of an IC based on the IC supply voltage. By doing so, the clock frequency is no longer constrained by a worst-case voltage level, and a higher effective clock frequency can be supported, increasing the IC performance. Embodiments will be referred to hereinafter as "wave clocking" systems and methods.

Figure 2:
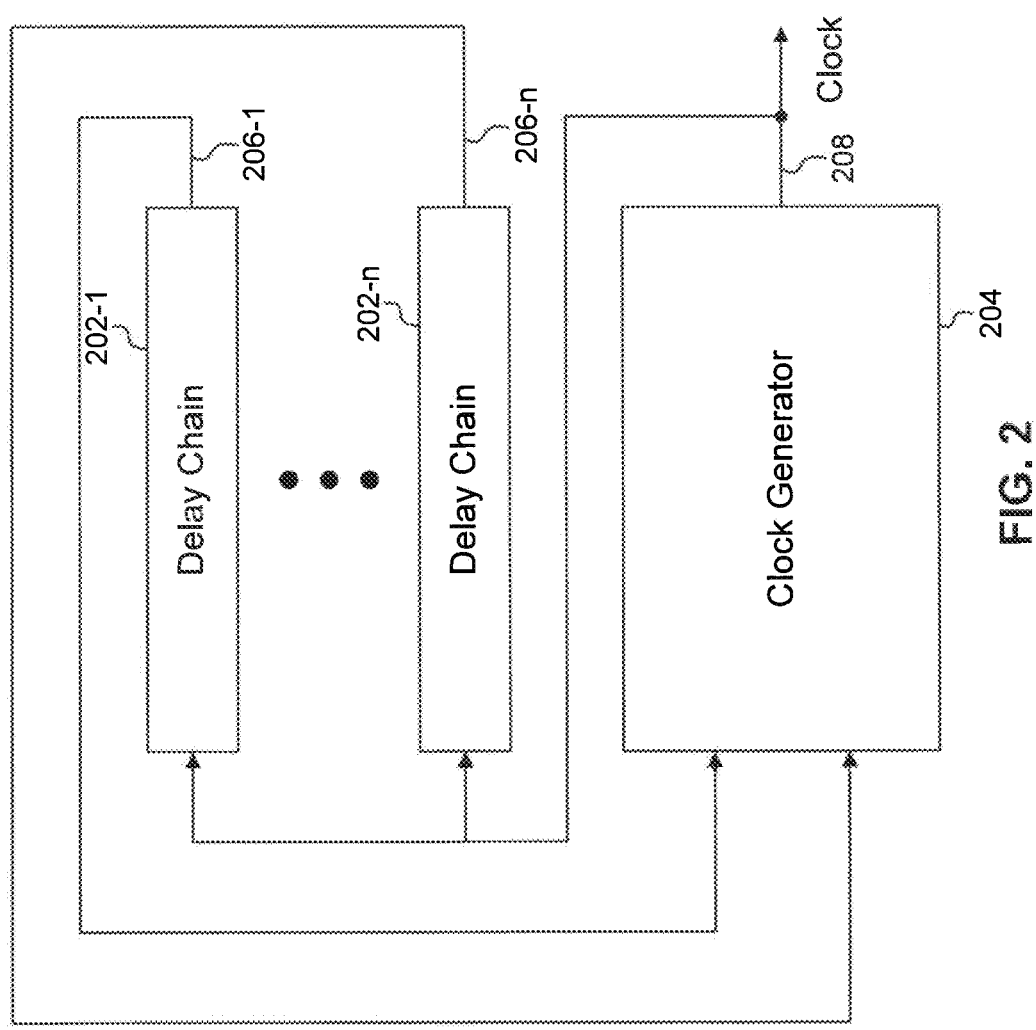
FIG. 2 illustrates a wave clocking system for regulating the clock frequency of an IC based on the supply voltage according to an embodiment of the present invention.

FIG. 2 illustrates a wave clocking system 200 for regulating the clock frequency of an IC based on the IC supply voltage according to an embodiment of the present invention. As shown in FIG. 2, wave clocking system 200 includes a plurality of delay chains 202-1 to 202-$n$, and a clock generator circuit 204. Respective outputs 206-1 to 206-$n$ of delay chains 202 are input to clock generator circuit 204. Based on outputs 206, clock generator circuit 204 produces a clock 208. Clock 208 is fed back as input to each of delay chains 202-1 to 202-$n$.

Wave clocking system 200 is exposed to the same supply voltage and temperature as that provided to the IC. As such, wave clocking system 200 experiences substantially similar supply voltage and temperature variations as the IC. As further described below, wave clocking system 200 is able to track supply voltage/temperature variations, in real time, by tracking changes in the speed of the IC logic due to these variations, and to produce an instantaneous clock frequency for the IC that results in substantially optimal IC performance given the variations. As such, the IC clock frequency is adapted in real time (e.g., within about one clock cycle) for optimal IC performance based on the supply voltage and temperature.

To track the changes in the speed of the IC logic due to supply voltage variations, wave clocking system 200 uses a plurality of delay chains 202, described above. Delay chains 202, which may each include a ring oscillator or other delay line element, are configured so that each matches substantially the delay of a respective logic path of the IC. As the delay of the logic path varies with supply voltage changes, the delay chain 202 matched to the logic path experiences substantially similar changes. In an embodiment, each of delay chains 202 is configured to have a slightly higher delay than its respective logic path that it is matched to. This margin, above the delay of the logic path, allows for on-chip variations to be accounted for (in practice, logic speed may vary within a single chip, and the margin ensures that the clock frequency accommodates the slowest part of the chip).

In an embodiment, the logic paths being matched by delay chains 202 are representative of logic paths of the IC. In another embodiment, the logic paths represent logic paths that experience the maximum delay (i.e., critical paths) under certain operating (i.e., voltage, temperature, etc.) conditions.

Typically, various factors may affect the delay response of a logic path, as well as the sensitivity of the delay of the logic path to varying operating conditions (e.g., supply voltage, temperature, etc.). For example, factors that typically affect the sensitivity of the delay of a logic path to a changing supply voltage include characteristics of logic gates in the path (e.g., high threshold voltage (HVT) or low threshold voltage (LVT) transistors, long channel versus short channel transistors, transistor stack height, etc.), structure of the path (e.g., whether the path is logic gate dominated or wire dominated), and temperature. As operating conditions (e.g., supply voltage, temperature, etc.) change, the logic paths that are slowest or fastest on the IC also change (also, the rates at which logic paths speed up or slow down are affected by the operating conditions). For example, typically, LVT transistors are faster than HVT transistors. However, HVT transistors are more sensitive to voltage than LVT transistors, and thus will speed up/slow down more than LVT transistors as voltage is increased/decreased. Thus, at high voltage, a LVT dominated logic path may be slower than a HVT dominated logic path, but faster than the HVT dominated logic path at lower voltage.

Accordingly, in an embodiment, delay chains 202 are configured to substantially match the delays of respective logic paths that are anticipated (e.g., by a priori testing) to have the maximum delays over particular operating conditions. In an embodiment, as further described below, delay chains 202 match at least a LVT path (i.e., logic path made entirely of LVT transistors) and a HVT path (i.e., logic path made entirely of HVT transistors), with the LVT and HVT path anticipated to provide, under all operating conditions, the outer bounds of the range of logic path delays on the IC.

Delay chains 202 each produces an output 206 having a period that is matched substantially (in an embodiment, slightly longer than) to the delay of the IC logic path that the delay chain is matched to. Clock generator circuit 204 receives outputs 206 of delay chains 202 and produces clock 208 as the output 206 with the maximum period. By selecting the slowest one of outputs 206, clock generator circuit 204 ensures that clock 208 accommodates the slowest of logic paths in the IC.

Figure 3:
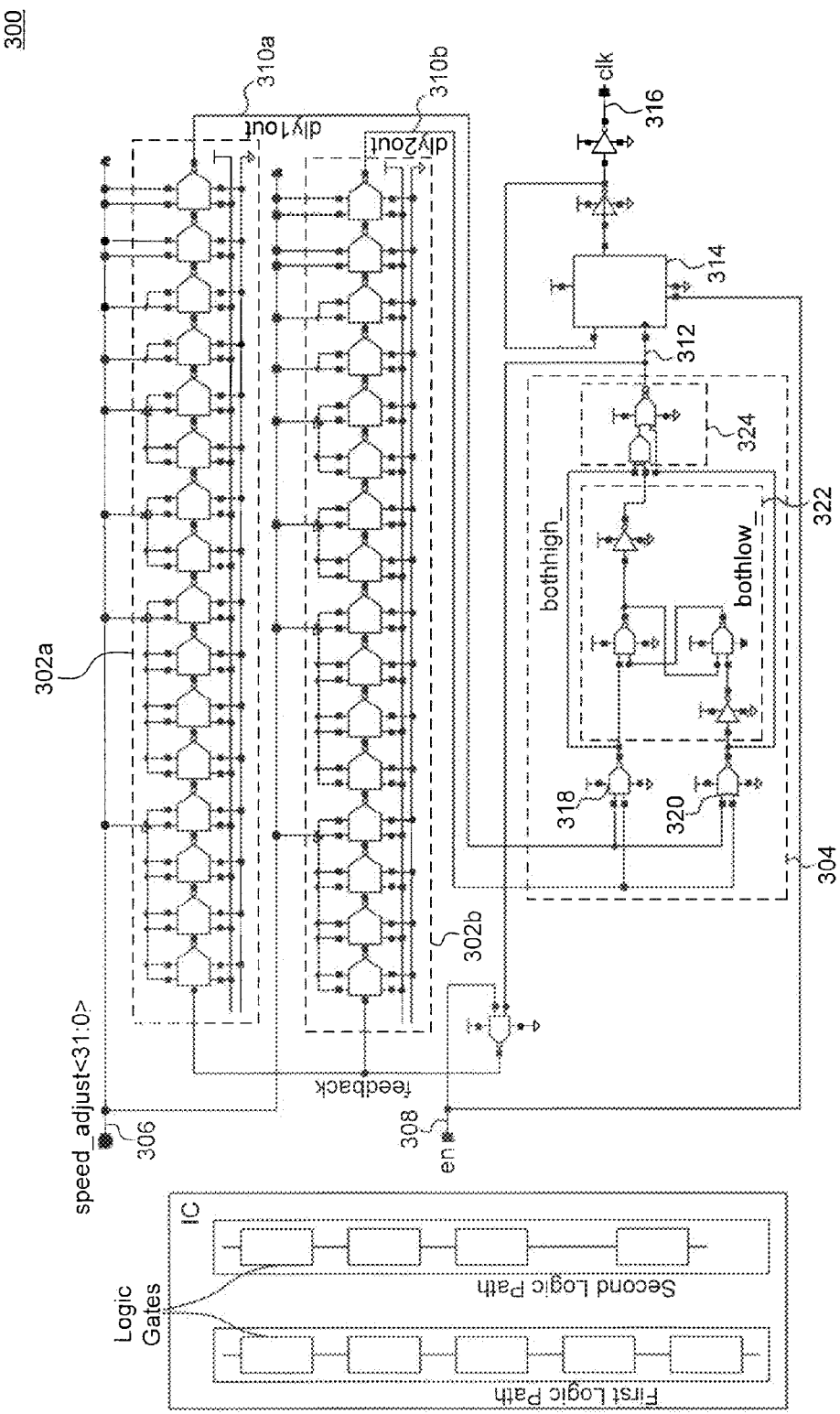
FIG. 3 illustrates an example implementation of a wave clocking system according to an embodiment of the present invention.

FIG. 3 illustrates an example implementation 300 of a wave clocking system according to an embodiment of the present invention. Example implementation 300 includes two delay chains 302a-b, a clock generator circuit 304, and an optional flip-flop 314. Respective outputs 310a-b of delay chains 302 are input to clock generator circuit 304. Based on outputs 310, clock generator circuit 304 produces a clock 312. Optionally, clock 312 is provided to flip-flop 314, which produces a second clock signal 316 that is divided by 2 relative to clock 312 (i.e., clock signal 312 is generated to be twice what is needed, and is then divided by 2 for a cleaner duty cycle).

As shown in FIG. 3, delay chains 302a-b each includes a plurality of delay cells in series. In an embodiment, some or all of the delay cells are programmable, which allows the delay of each delay chain to be configured independently, as needed, to match different logic paths of the IC. In an embodiment, the delays of delay chains 302a-b can be configured or re-configured using a speed_adjust signal 306. For example, the delays may be set only one time or at every boot up of the system. Speed_adjust signal 306 also allows adjusting the margin of each delay chain 302. In practice, logic speed may vary within a single chip, and voltage and circuit speed inaccuracies may exist. The margin ensures that the clock frequency accommodates the slowest part of the chip. In an embodiment, speed variations across the chip can be measured, and the margin of each delay chain 302 can be set accordingly.

In an embodiment, delay chains 302a-b match respectively a LVT path (i.e., logic path made entirely of LVT transistors) and a HVT path (i.e., logic path made entirely of HVT transistors), with the LVT and HVT path anticipated to provide, under all operating conditions, the outer bounds of the range of logic path delays on the IC.

Delay chains 302a-b produce respective outputs 310a-b. Outputs 310a-b have periods matched substantially (in an embodiment, slightly longer than) to the delays of the respective IC logic paths that delay chains 302a-b are matched to. Outputs 310a-b are provided to clock generator circuit 304.

Clock generator circuit 304 receives outputs 310a-b of delay chains 302a-b via a two-input NAND gate 318 and a two-input NOR gate 320. The outputs of NAND gate 318 and NOR gate 320 are fed, simultaneously, to a modified S/R latch 322 and an AND/OR output stage 324. AND/OR output stage 324 toggles to a logic low whenever outputs 310a-b are both high, and toggles to a logic high whenever outputs 310a-b are both low. As such, clock generator circuit 304 produces clock 312 whose rising edges correspond to the latest of the rising edges of outputs 310a-b, and whose falling edges correspond to the latest of the falling edges of outputs 310a-b. Accordingly, clock generator circuit 304 produces clock 312 that takes (at every clock cycle) the value of the slowest of outputs 310a-b of delay chains 302a-b (the slowest being the output 310 with the latest rising or falling edge). By selecting the slowest one of outputs 310, clock generator circuit 304 ensures that clock 312 accommodates the slowest of logic paths in the IC.

As would be understood by a person of skill in the art based on the teachings herein, example implementation 300 can be extended to more than two delay chains. For example, four delay chains, each matched to a respective logic path, can be used. Clock generator circuit 304 can be readily modified to support such implementation, by using a four-input NAND for NAND gate 318 and a four-input NOR for NOR gate 320 to receive the outputs of the delay chains.

In an embodiment, as shown in FIG. 3, the wave clocking system implementation includes an enable signal 308. Enable signal 308 can be used to put the wave clocking system in sleep mode when the IC is operating in low power mode or sleep mode, for example. Another use of enable signal 308 is to have the operation of the wave clocking system mimic that of the IC, so that the wave clocking system ages at substantially the same rate as the IC. Accordingly, enable signal 308 can be used to turn on/off the wave clocking system whenever the IC is on/off. As such, the wave clocking system will track not only operating conditions of the IC but also the aging of the IC.

Figure 4:
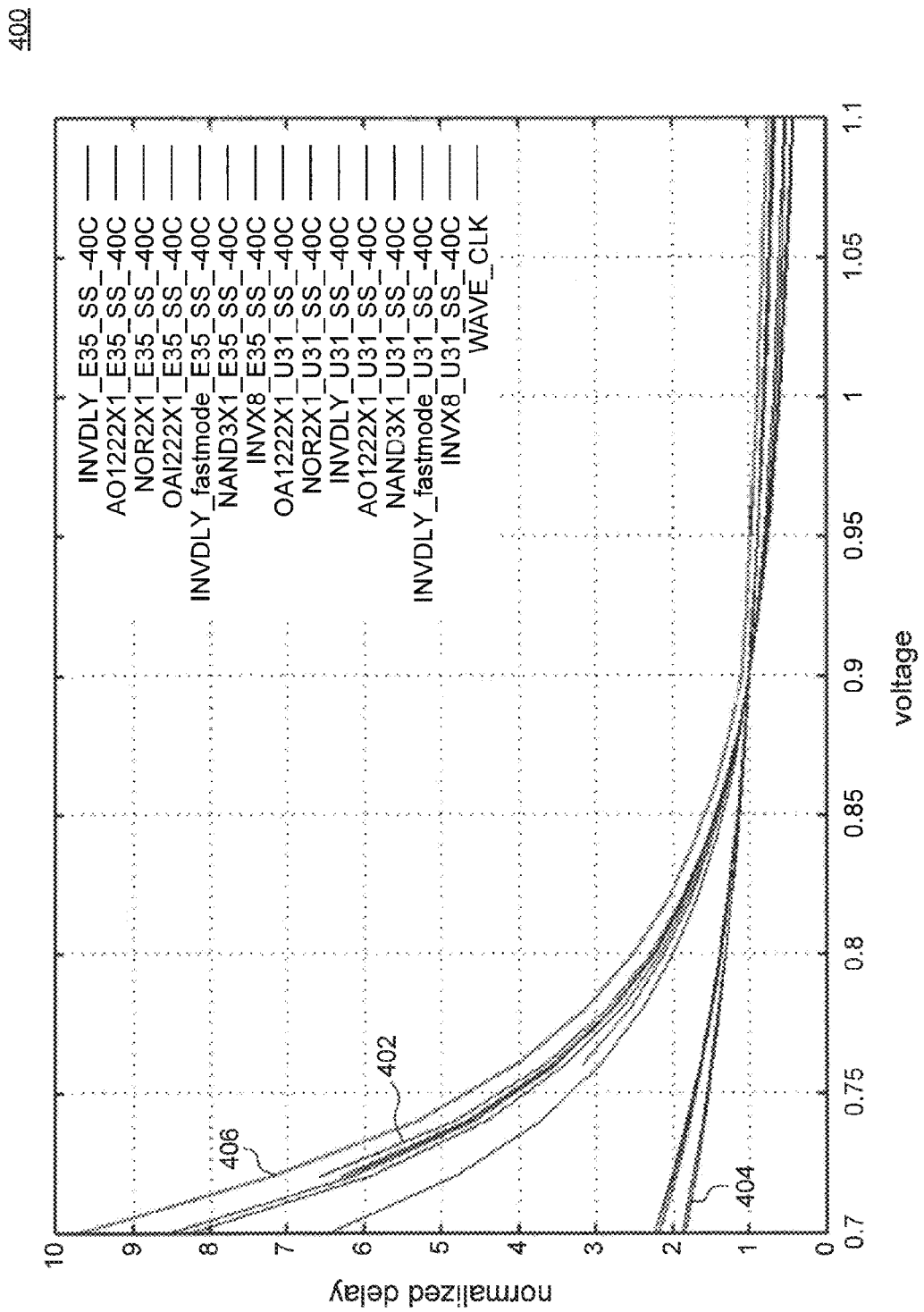
FIG. 4 illustrates an example configuration of the example wave clocking system implementation of FIG. 3 according to an embodiment of the present invention.

FIG. 4 illustrates an example configuration 400 of the example wave clocking system implementation of FIG. 3 according to an embodiment of the present invention. In example configuration 400, delay chains 302a-b of the wave clocking system are configured, respectively, to match an ultra LVT logic path and an ultra HVT logic path. In an embodiment, the LVT path is further made of 31 nm channel length, lower stack height transistors and is wire dominated, and the HVT path is further made of 35 nm channel length, larger stack height transistors and is gate dominated. The normalized delay versus voltage of the HVT logic path is represented by curve 402. The normalized delay versus voltage of the LVT logic path is represented by curve 404.

As shown in FIG. 4, in this particular example, the LVT and HVT paths provide, under all operating voltage conditions, the outer bounds of the range of logic path delays on the IC. In other words, the delays of all other logic paths of the IC fall somewhere in between lines 402 and 404. Specifically, at voltages below approximately 0.9 volts, the HVT logic path is the slowest logic path of the IC. Above 0.9 volts, the LVT path becomes the slowest path of the IC.

The clock produced by the wave clocking system is represented by curve 406. As shown, at any time, curve 406 is higher (by a slight margin) than any of the curves 402 and 404, representing the HVT and LVT paths, respectively. As such, the period of the clock produced by the wave clocking system is larger, at any time, than the delay of any logic paths of the IC.

In other embodiments, the wave clocking system may be driving a block whose gates are all of the same VT type. As such, the wave clocking system may use delay chains of that single VT type. Multiple delay chains may still be employed to model other factors that cause different delay sensitivities to voltage, such as gate type or wire dominated vs. gate load dominated.

Figure 5:
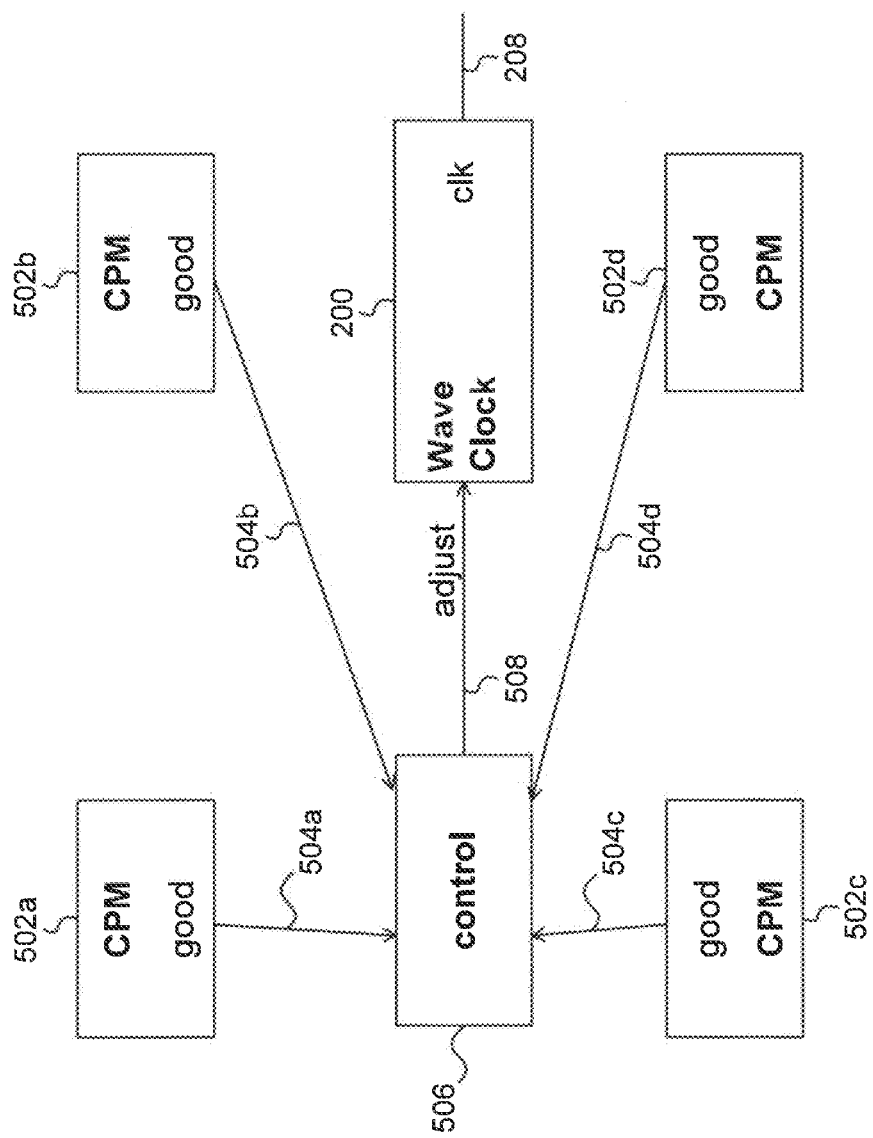
FIG. 5 illustrates an example integrated circuit (IC) using a wave clocking system according to an embodiment of the present invention.

FIG. 5 illustrates an example integrated circuit (IC) 500 using a wave clocking system according to an embodiment of the present invention. IC 500 includes a wave clocking system 200, a plurality of clock performance monitor (CPM) modules 502, and a control module 506. Wave clocking system 200, as described above, is exposed to the same operating conditions as IC 500, and produces a clock signal 208.

In practice, logic speed can vary across IC 500 due to local process variations. For example, one corner of IC 500 may have faster running logic than another corner of IC 500. In addition, wave clocking system 200 may be located in a faster or slower corner of IC 500, for example. In an embodiment, as described above, each of delay chains 202 of wave clocking system 200 is configured to have a slightly higher delay than its respective logic path that it is matched to. This margin, above the delay of the logic path, allows for on-chip variations to be accounted for by ensuring that the clock frequency produced by wave clocking system 200 accommodates the slowest part of the chip.

In example IC 500, the margin can be further reduced (thus allowing for the IC clock frequency to be increased) by using CPM modules 502. CPM modules 502 are distributed across IC 500 such that each of CPM modules 502 monitors a respective part of IC 500. Each of CPM modules 502 compares the period of clock signal 208 against the delay of a respective critical logic path in its respective part of IC 500, and returns a "good" logic value to control module 506, via a respective output signal 504, when the period of clock signal 208 is longer than the delay of the respective critical logic path. If at least one of CPM modules 502 does not return a "good" logic value to control module 506 (i.e., clock signal 208 is too fast for at least one part of IC 500), then control module 506 controls wave clocking signal 200, via a control signal 508, to increase the period of clock signal 208. In an embodiment, control module 506 adjusts the period of clock signal 208 by re-configuring the delay of at least one of delay chains 302a-b using speed_adjust signal 306, described above in FIG. 3.

In an embodiment, CPM modules 502 are used to calibrate at boot-time the period of clock signal 208 produced by wave clocking system 200. Specifically, the period of clock signal 208 is set at an initial value and outputs 504 of CPM module 502 are examined. If all of outputs 504 indicate "good" logic values, then the period of clock signal 208 is decreased by a pre-determined step value and outputs 504 are re-examined. The process is repeated until at least one of outputs 504 does not return a "good" logic value, at which time the period of clock signal 208 is increased by a pre-determined step value and set at this level. CPM modules 502, in the same manner, can also be used periodically at run-time to calibrate clock signal 208.

Figure 6:
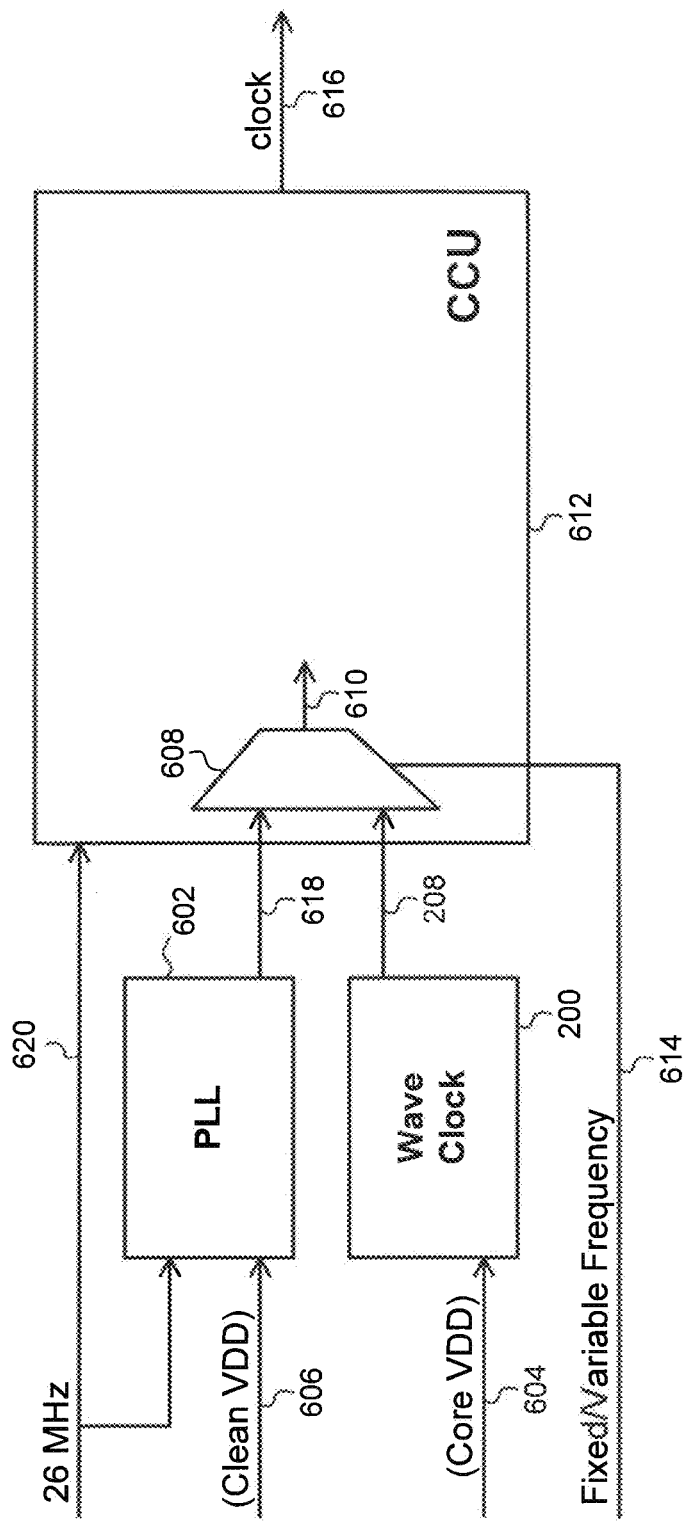
FIG. 6 illustrates an example clock generation system that integrates a wave clocking system according to an embodiment of the present invention.

FIG. 6 illustrates an example clock generation system 600 that integrates a wave clocking system according to an embodiment of the present invention. Example clock generation system 600 includes a wave clocking system 200, a phase locked loop (PLL) 602, and a clock control unit (CCU) 612. In other embodiments, PLL 602 and/or CCU 612 may be eliminated.

As shown in FIG. 6, CCU 612 can operated using a reference clock 620, a PLL clock 618, or a wave clock 208 as a primary clock source. PLL clock 618 is produced by PLL 602 based on reference clock 620 and is a fixed frequency clock. PLL 602 requires a clean supply voltage 606, which is free of voltage transients, to generate fixed frequency clock 618. Wave clock 208 is produced by wave clocking system 200. As described above, wave clock 208 is a variable frequency clock that tracks IC supply voltage variations. As such, wave clocking system 200 is supplied a core supply voltage 604, identical to the one provided to the IC. Core supply voltage 604 may experience voltage transients as described above.

To select between PLL clock 618 or wave clocking system clock 208, CCU 612 includes a multiplexer 608. In other embodiments, multiplexer 608 is located outside of CCU 612. Multiplexer 608 receives PLL clock 618 and clock 208 and provides either of the two clocks to CCU 612 as a clock signal 610. Multiplexer 608 is controlled by a select signal 614, which determines whether CCU 612 is to be provided a fixed or a variable frequency clock.

CCU 612 uses clock signal 610 or reference clock 620, as a primary clock source, to produce one or more clock signals, including a clock signal 616. The produced clock signals are provided to different functional blocks or ICs of the system. For example, clock signal 616 may be provided to the central processing unit (CPU) of the system. In an embodiment, clock signal 616 is input into a clock tree, which distributes the clock to different parts of the CPU block.

Figure 7:
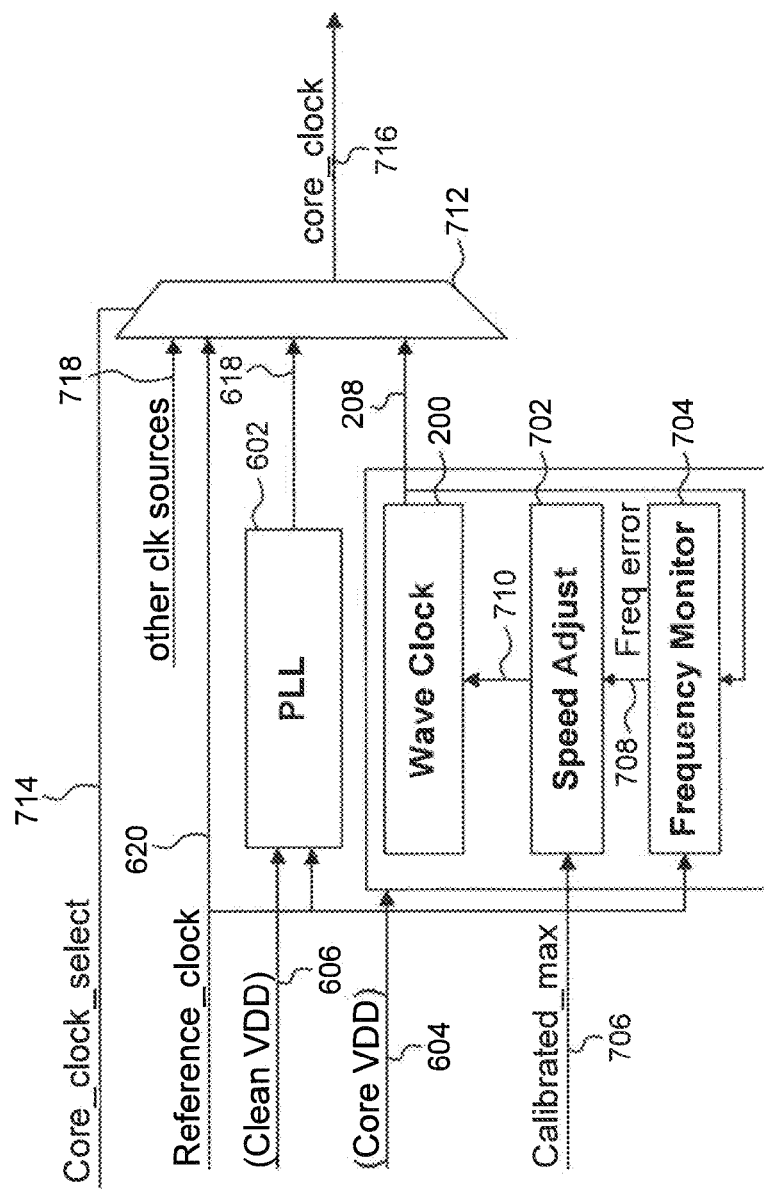
FIG. 7 illustrates another example clock generation system that integrates a wave clocking system according to an embodiment of the present invention.

FIG. 7 illustrates another example clock generation system 700 that integrates a wave clocking system according to an embodiment of the present invention. Like example system 600, example system 700 includes a wave clocking system 200 and a phase locked loop (PLL) 602. In other embodiments, PLL 602 may be eliminated. Further, example system 700 includes a speed adjust control circuit 702, a frequency monitor circuit 704, and a multiplexer 712.

Speed adjust control circuit 702 and frequency monitor circuit 704 allow for the control of wave clock 208 produced by wave clocking system 200, so as to maintain it near a target frequency. Typically, without additional control, wave clocking system 200 produces wave clock 208 so as to correspond to the maximum supported clock frequency based on the supply voltage. In certain situations, however, there may be a need to limit wave clock 208 to a target frequency below a maximum logic supported clock frequency.

In an embodiment, as shown in FIG. 7, frequency monitor 704 receives wave clock 208 and reference clock 602, which represents the target frequency. Frequency monitor 704 generates a frequency error signal 708 based on a difference between wave clock 208 and reference clock 602. Frequency monitor 704 provides frequency error signal 708 to speed adjust control circuit 702.

Based on frequency error signal 708, speed adjust control circuit 702 outputs a control signal 710 to wave clocking system 200 to increase/decrease the speed of the delay chains of wave clocking system 200, so as to bring frequency error signal 708 closer to zero. In an embodiment, control signal 710 corresponds to speed_adjust signal 306 described above in FIG. 3.

In an embodiment, speed adjust control circuit 702 is also provided a calibrated maximum value 706, to ensure that wave clock 208 does not exceed a maximum logic supported frequency. In particular, calibrated maximum value 706 ensures that control signal 710 does not configure wave clocking system 200 so as to produce wave clock 208 greater than the maximum logic supported frequency.

Wave clock 208, PLL clock 618, reference clock 620, and optionally other clock sources 718 are provided to multiplexer 712. A select signal 714 controls multiplexer 712 to select one of the input clocks as a core clock 716. Core clock 716 may then be provided to a CCU, such as CCU 612, for example.

Figure 8:
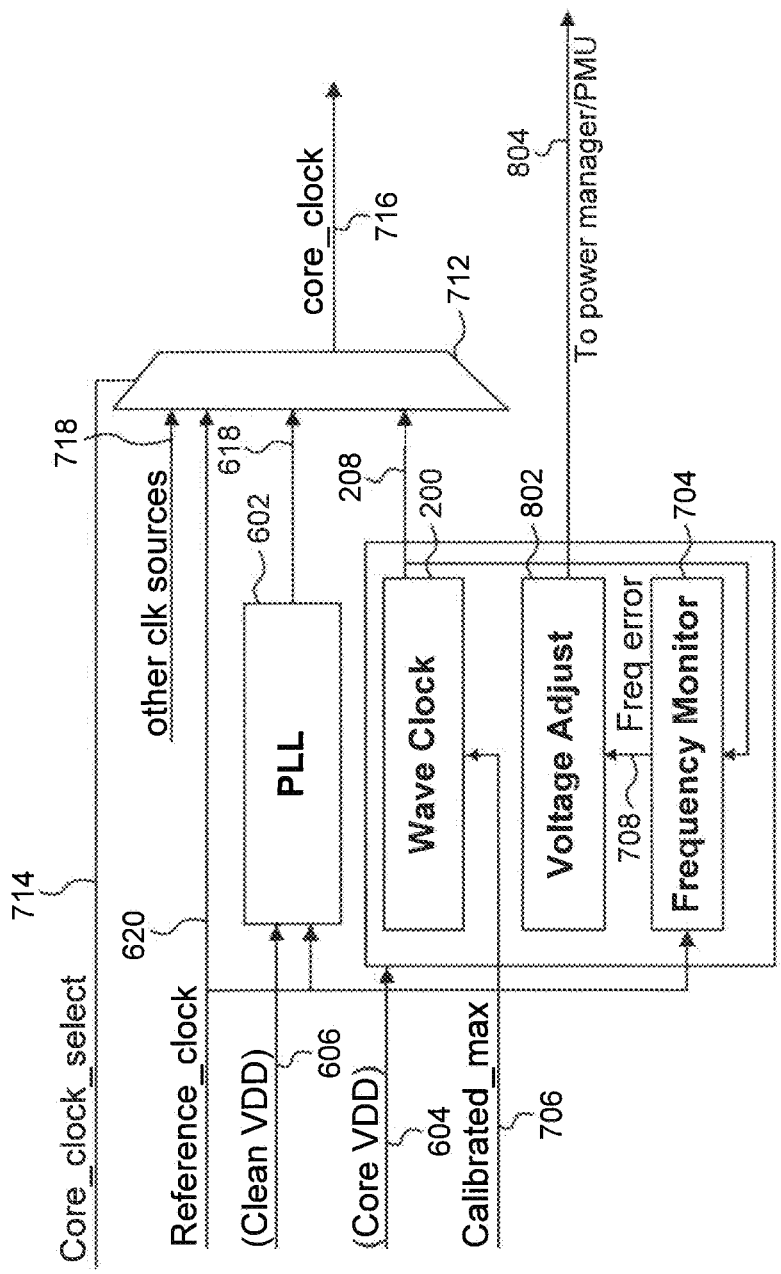
FIG. 8 illustrates another example clock generation system that integrates a wave clocking system according to an embodiment of the present invention.

FIG. 8 illustrates another example clock generation system 800 that integrates a wave clocking system according to an embodiment of the present invention. Like example system 600, example system 800 includes a wave clocking system 200 and a phase locked loop (PLL) 602. In other embodiments, PLL 602 may be eliminated. Further, example system 800 includes a voltage adjust control circuit 802, a frequency monitor circuit 704, and a multiplexer 712.

Like example system 700, example system 800 includes means to maintain wave clock 208 near a target frequency, below a maximum logic supported frequency. In particular, wave clocking system 200 is first fixed at its maximum calibration setting by providing it calibrated maximum value 706. In an embodiment, calibrated maximum value 706 corresponds to speed_adjust signal 306 described above in FIG. 3 and configures the delay chains of wave clocking system 200 so as to produce the maximum possible clock frequency.

Subsequently, the produced wave clock 208 is provided to frequency monitor 704 along with reference clock 602, which represents the target frequency. Frequency monitor 704 generates a frequency error signal 708 based on a difference between wave clock 208 and reference clock 602. Frequency monitor 704 provides frequency error signal 708 to voltage adjust control circuit 802.

Based on frequency error signal 708, voltage adjust control circuit 802 outputs a control signal 804 to the power manager or power management unit (PMU) to increase/decrease the supply voltage, as necessary, to cause a corresponding increase/decrease in wave clock 208, substantially equal to the frequency error represented by frequency error signal 708. Accordingly, wave clock 208 is brought and maintained near the target frequency by adjusting the supply voltage, instead of adjusting wave clocking system 200 directly.

Figure 9:
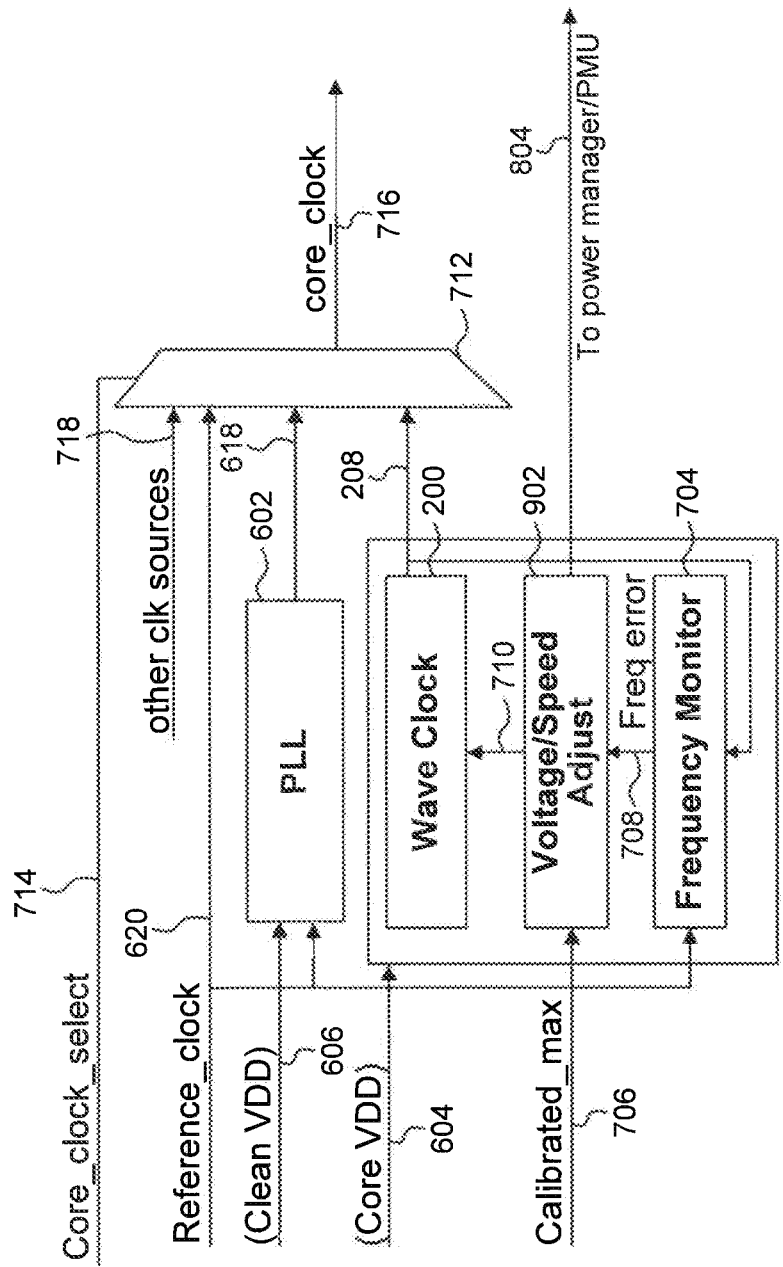
FIG. 9 illustrates another example clock generation system that integrates a wave clocking system according to an embodiment of the present invention.

FIG. 9 illustrates another example clock generation system 900 that integrates a wave clocking system according to an embodiment of the present invention. Like example system 600, example system 900 includes a wave clocking system 200 and a phase locked loop (PLL) 602. In other embodiments, PLL 602 may be eliminated. Further, example system 900 includes a voltage/speed adjust control circuit 902, a frequency monitor circuit 704, and a multiplexer 712.

Thus, example system 900 combines both means for controlling wave clock 208 of example systems 700 and 800. Specifically, based on frequency error signal 708, voltage/speed adjust control circuit 902 outputs a control signal 710 as described above in FIG. 7 and a control signal 804 as described above in FIG. 8.

Control signal 710 controls wave clock 208 by controlling wave clocking system 200 directly. This provides a relatively fast feedback loop to keep wave clock 208 near the target frequency. Control signal 804 controls wave clock 208 indirectly by controlling the supply voltage. Adjustments to the voltage from the power manager/PMU happen more slowly. However, the adjustments allow the supply voltage to be optimized for any target frequency, i.e., allows for adaptive voltage scaling (AVS) adjustments to be made automatically.

In addition to the uses described above, embodiments may also be used to reduce production test cost and increase the timing fault coverage of integrated circuits. Typically, ICs are tested using a logic built-in self-test (LBIST) in which hardware or software is built into the ICs to allow them to test their own operation. LBIST scans a test pattern into the logic using a scan clock frequency. Once scanned in, it applies a functional clock frequency to capture the logic result. Logic failures and timing failures can be detected by observing the data that gets scanned out during the next scan phase. One common problem is that the high logic activity during the scan phase causes large load currents on the supply, which introduces large voltage transients at the logic. The capture clock may capture the result at a high or a low voltage. The frequency of the capture clock needs to be limited to correspond to the minimum voltage. This means that many capture clocks are capturing results with a frequency that is lower than the frequency that is needed to test the timing of the logic. Thus, timing fault coverage is lowered.

Using embodiments, the capture clock can be provided using a wave clocking system. In this case, the clock frequency during the capture clock tracks the frequency which corresponds to the desired speed of the logic. Accordingly, higher timing fault coverage is achieved. In addition, the scan clock can be operated at the much higher wave clock frequency, since the logic is now tolerant of the voltage transients. As a result of the higher scan frequency, the LBIST test time will be reduced, which reduces production test cost.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A system for generating a clock signal for an integrated circuit (IC) comprising a plurality of logic paths, comprising:
   first and second delay chains configured to produce first and second output signals respectively, wherein a first period of the first output signal is configured to match substantially a first predetermined delay of a first logic path of the plurality of logic paths of the IC, and wherein a second period of the second output signal is configured to match substantially a second predetermined delay of a second logic path of the plurality of logic paths of the IC; and
   a clock generator circuit configured to receive the first and second output signals of the first and second delay chains and to produce the clock signal as the slower of the first and second output signals.

2. The system of claim 1, wherein the first and second delay chains are configured to receive the clock signal as an input.

3. The system of claim 1, wherein the system is exposed to substantially similar supply voltage and temperature as the IC.

4. The system of claim 1, wherein the first and second delay chains each includes a ring oscillator circuit.

5. The system of claim 1, wherein the first and second delay chains each includes a plurality of delay cells in series.

6. The system of claim 5, wherein at least one of the plurality of delay cells is programmable, thereby allowing the first and second periods of the first and second output signals to be adjusted independently.

7. The system of claim 1, wherein the first and second periods of the first and second output signals are higher by a predetermined margin than the first and second delays of the first and second logic paths.

8. The system of claim 1, wherein the first and second logic paths are representative of logic paths in the IC.

9. The system of claim 1, wherein the first logic path corresponds to a logic path of the IC having a maximum delay among all logic paths of the IC under first operating conditions of the IC, and wherein the second logic path corresponds to a logic path of the IC having the maximum delay among all the logic paths of the IC under second operating conditions of the IC.

10. The system of claim 1, Wherein the first and second logic paths correspond respectively to a low threshold voltage logic path and a high threshold voltage logic path.

11. The system of claim 1, wherein rising edges of the clock signal correspond to the latest of rising edges of the first and second output signals, and wherein falling edges of the clock signal correspond to the latest of falling edges of the first and second output signals.

12. The system of claim 1, further comprising:
   a plurality of clock performance monitors (CPMs), each located in a respective part of the IC and each configured to generate an indication of whether or not the clock signal is of adequate frequency for the respective part of the IC; and
   a control module configured to control at least one of the first and second delay chains based on the indications generated by the plurality of CPMs.

13. The system of claim 1, further comprising:
   means for turning on/off the system together with the IC, thereby having the system age at substantially the same rate as the IC.

14. A system for generating a clock signal for an integrated circuit (IC), comprising:
   a plurality of delay chains, associated with respective logic paths of the IC, configured to produce respective output signals having respective periods substantially matched to respective predetermined delays of the respective logic paths of the IC; and
   a clock generator module configured to produce the clock signal as the slowest of the respective output signals of the plurality of delay chains.

15. The system of claim 14, wherein at least one of the plurality of delay chains is configured to produce a respective output signal having a respective period substantially matched to a predetermined delay of a low threshold voltage logic path of the IC.

16. The system of claim 14, wherein at least one of the plurality of delay chains is configured to produce a respective output signal having a respective period substantially matched to a predetermined delay of a high threshold voltage logic path of the IC.

17. The system of claim 14, further comprising:
   means for turning on/off the system together with the IC, thereby having the system age at substantially the same rate as the IC.

18. The system of claim 14, wherein the system is configured to operate using a same supply voltage as provided to the IC.

19. A method for generating a clock signal for an integrated circuit (IC) comprising a plurality of logic paths, comprising:
   generating first and second signals having respective first and second periods that match substantially first and second predetermined delays of respective first and second logic paths of the plurality of logic paths of the IC; and
   generating the clock signal as the slower of the first and second signals.

20. The method of claim 19, wherein the first and second logic paths correspond respectively to a low threshold voltage logic path and a high threshold voltage logic path of the IC.

* * * * *

UNITED STATES PATENT AND TRADEMARK OFFICE
CERTIFICATE OF CORRECTION

| | | |
|---|---|---|
| PATENT NO. | : 8,810,300 B2 | Page 1 of 1 |
| APPLICATION NO. | : 13/331796 | |
| DATED | : August 19, 2014 | |
| INVENTOR(S) | : Tim Sippel | |

It is certified that error appears in the above-identified patent and that said Letters Patent is hereby corrected as shown below:

In the Claims

Column 9, line 52, claim 10, replace "Wherein" with --wherein--.

Column 10, line 21, claim 14, replace "haying" with --having--.

Signed and Sealed this
Seventeenth Day of March, 2015

Michelle K. Lee
*Director of the United States Patent and Trademark Office*